United States Patent [19]

Ter Maat et al.

[11] Patent Number: 5,190,898
[45] Date of Patent: Mar. 2, 1993

[54] POURABLE MOLDING COMPOUND CONTAINING SINTERABLE POWDERS

[75] Inventors: Johan H. H. Ter Maat, Mannheim; Knut Oppenlaender, Ludwigshafen; Hans-Josef Sterzel, Dannstadt-Schauernheim, all of Fed. Rep. of Germany

[73] Assignee: BASF Aktiengesellschaft, Ludwigshafen, Fed. Rep. of Germany

[21] Appl. No.: 747,572

[22] Filed: Aug. 20, 1991

[30] Foreign Application Priority Data

Aug. 25, 1990 [DE] Fed. Rep. of Germany ....... 4026965

[51] Int. Cl.$^5$ .............................................. C04B 35/10
[52] U.S. Cl. ...................................... 501/127; 501/128
[58] Field of Search ................... 501/94, 1, 127, 128, 501/87, 88, 97, 103, 137, 152; 264/65, 60, 63

[56] References Cited

U.S. PATENT DOCUMENTS

| | | | |
|---|---|---|---|
| 4,486,405 | 12/1984 | Klein | 106/504 |
| 4,520,114 | 5/1985 | David | 501/103 |
| 4,705,767 | 11/1987 | Cheng et al. | 264/44 |
| 4,889,672 | 12/1989 | Akutsu et al. | 264/63 |
| 4,894,194 | 1/1990 | Janney | 264/63 |
| 4,985,380 | 1/1991 | Douden | 501/128 |
| 4,994,420 | 2/1991 | Buney et al. | 501/126 |
| 5,073,319 | 12/1991 | Sterzel | 264/101 |
| 5,089,455 | 2/1992 | Ketcham et al. | 501/104 |

Primary Examiner—William R. Dixon, Jr.
Assistant Examiner—Alan Wright
Attorney, Agent, or Firm—Keil & Weinkauf

[57] ABSTRACT

Pourable molding compounds containing sinterable powders contain, based on the total compound,
a) from 60 to 95% by weight of sinterable powders,
b) from 0.1 to 10% by weight of a surfactant, obtainable by alkoxylation of an aliphatic alcohol, fatty acid, fatty acid amide, fatty acid ester or aliphatic amine,
c) from 2 to 35% by weight of an organic solvent having a melting point <10° C. and a boiling point of from 40° to 180° C., selected from the group comprising the alkanes, ethers, esters and ketones.

10 Claims, No Drawings

POURABLE MOLDING COMPOUND CONTAINING SINTERABLE POWDERS

Three methods are available for shaping sintered articles made from powders. The simplest is pressing, either axial or isostatic. Pressing is an inexpensive shaping method in which the powder (mixture) is usually wet-ground, treated with a few percent of an organic pressing aid and then spray-dried to give granules, which are pressed at a pressure of 100–6,000 bar. The disadvantages of axial pressing are die wear and the restriction to simple geometries of relatively modest dimensions (a few centimeters); the density variations which occur in the compact due to wall friction are serious and result in different compaction rates during sintering and thus in stresses, cracking and warping in the sintered molding.

Cold isostatic pressing offers significantly better homogeneity in the compact and, in addition, is somewhat more flexible with respect to the shapes which can be produced. However, reworking in the compact or sintered state is always necessary. Complicated shapes are not possible. For more demanding shaping tasks, slip casting and injection molding are the proven methods.

In slip casting, the powders are first ground with a dispersion aid in a solvent (usually water). The resultant suspension is dewatered in a porous mold, the body forming on the porous wall. Formation of the body can be accelerated by applying pressure. However, slip casting is impracticable for relatively large wall thicknesses due to long filtration times. The great advantages of slip casting are the homogeneous and high density of the compact (from 55 to 65% by volume) and the ability to produce complex and large moldings. Slip casting is particularly suitable for the production of hollowware; in solid ceramic articles, however, a low-density zone forms in the center on dewatering on all sides. Release from the mold is frequently difficult and, due to the roughness of the porous surface, the surface quality of the molding is poor, which makes expensive reworking necessary.

Some of these problems in slip casting can be solved by using a fine-pore membrane on the porous surface (see, for example, German Laid-Open Application DE-OS 3 741 002). In this method, a membrane is placed in the porous mold, and the mold release and surface quality are thus improved. However, the membrane must be replaced after each casting, which is impracticable. Membranes installed permanently in the mold only achieve small casting runs and cannot be cleaned by back-washing as usual.

In injection molding, the powder is mixed with a thermoplastic polymer to give highly filled granules (50–60% by volume of powder). During processing, the granules are re-melted in a screw injection-molding machine and injected at 10–1,000 bar into a temperature-controlled mold. Before sintering, the binder must first be removed from the solidified molding. Normally, this is done using a combination of evaporation and pyrolysis; removal of the binder must be carried out very carefully in order to prevent cracking. To remove the binder, the green molding must be reheated to above the softening point of the thermoplastic, during which deformation caused by gravitation can easily occur. This deformation and the anisotropic shrinkage make reworking of the sintered part unavoidable, in spite of the good surface quality.

For these reasons, although conventional injection molding has the advantages of a short cycle time and good surface quality, the economics suffer due to the long and difficult binder removal. There is an alternative injection-molding method in which the plastic phase is basically a solution of a high-molecular-weight polymer in a solvent. An example is described in U.S. Pat. No. 4,113,480. A process for the production of powder metal moldings uses a 20–50% strength solution of methylcellulose in water. Solidification is effected by injection into a heated mold; at elevated temperature, methylcellulose precipitates and forms a gel. However, the gel strength is unsatisfactory and, in addition, the polymer solution is relatively viscous, and problems similar to those for thermoplastics thus occur. A further variant is described in German Laid-Open Application DE-OS 36 30 690 in which a thermoplastic is dissolved in a mineral oil at the processing temperature; the compaction is effected by cooling. However, the shaped part must be embedded for binder removal, since the binder is already free-flowing at the temperatures necessary for evaporation of the mineral oil.

It is therefore an object of the present invention to provide molding compounds which are highly filled by sinterable powders and can easily be shaped to form compacts, from which the molding aid can be removed before sintering without deformation and cracking and which can then be sintered to form moldings with a smooth surface, high dimensional stability and neither external nor internal defects, such as inhomogeneities.

We have found that this object can be achieved by a pourable molding compound containing sinterable powders which comprises, based on the total compounds, a) from 60 to 97% by weight of sinterable powders, b) from 0.1 to 10% by weight of surfactants, obtainable by alkoxylation of aliphatic alcohols, fatty acids, fatty acid amides or aliphatic amines, of the general formula

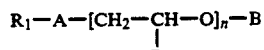

or

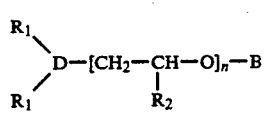

or

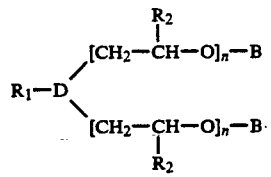

where $R_1$ is an aliphatic hydrocarbon radical having from 10 to 40 carbon atoms, A is

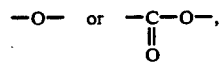

$R_2$ is $-H$, $-CH_3$ and/or $-CH_2 \cdot CH_3$,

B is hydrogen,

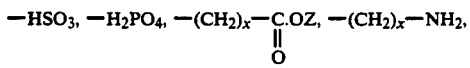

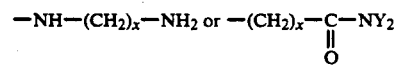

where Z is hydrogen, an alkali metal or ammonium, x is an integer from 1 to 3, and Y is H or —$CH_3$, D is

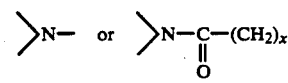

where x is also as defined above, and n is an integer from 1 to 40, and c) from 2 to 35% by weight of an organic solvent having a melting point <10° C. and a boiling point of from to 180° C., selected from the group comprising the alkanes, ethers, esters and ketones.

The molding compounds according to the invention have a solidification point in the range from −20 to 35° C. This means that they are free-flowing above this temperature and rapidly, completely and reversibly solidified below this temperature.

It is thus possible to mold the compounds which are highly filled with sinterable powders at above their solidification point by, for example, injection molding. After cooling, the solvent is removed from the solidified molding, for example by vacuum drying, and the surfactant remaining is removed, for example, by pyrolysis. The resultant compact can then be sintered in a conventional manner.

The molding compounds according to the invention contain from 60 to 97% by weight, preferably from 80 to 95% by weight, of sinterable powders, which, for the purposes of the present invention, are oxidic ceramic powders, for example $Al_2O_3$, $ZrO_2$, $Y_2O_3$, $BaTiO_3$ or aluminum silicates, or nonoxidic ceramic powders, such as SiC, $Si_3N_4$ or WC, and metal powders, such as Fe or Si having grain sizes of from 0.1 to 50 μm. It is of course also possible to employ mixtures of these substances.

From 0.1 to 10% by weight, preferably from 0.5 to 5% by weight, of the surfactant are used. It is of course also possible to employ mixtures of surfactants. The ideal value is a compromise between dispersibility and the desire for burning out as little residual surfactant as possible in the dried molding.

The surfactants present in the molding compounds according to the invention are those obtainable by alkoxylation, i.e. by adduction of ethylene oxide, propylene oxide and/or butylene oxides with compounds containing an active hydrogen. These compounds are fatty alcohols, fatty acids or their esters and amides, or primary or secondary aliphatic amines, in each case containing preferably unbranched and saturated hydrocarbon radicals having from 10 to 40 carbon atoms, preferably 16 to 22 carbon atoms. As the chain length increases, the solidification temperature of the molding compounds according to the invention rises, while, conversely, the dispersibility decreases.

The mean degree of alkoxylation should be at least one, expressed by n, in order to ensure the dispersibility of the sinterable powder in the solvent. The upper limit for the degree of alkoxylation is given by the required solubility of the surfactant in the solvent, which also depends, inter alia, on the length of the hydrocarbon radical $R_1$. In general, the degree of alkoxylation is not more than 40. As the degree of alkoxylation increases, the solidification temperature of the molding compounds according to the invention rises and may reach the technologically desirable range of from 15° to 35° C., while the dispersibility decreases.

The solvent or solvent mixture is preferably employed in an amount of from 3 to 15% by weight. It should have a melting point of below 10° C. and a boiling point of from 40° to 180° C., preferably from 60° to 130° C. Suitable solvents are alkanes, ethers, esters and ketones. Preferred solvents from this group are those which have low polarity. Examples of preferred solvents are n-octane and diisopropyl ether. The solvent chosen has a melting point below the solidification temperature of the particular molding compound. In addition, it should be sufficiently volatile to permit vacuum drying. On the other hand, the solvent must not evaporate so quickly during processing that overquick thickening or encrustation occurs.

It is expedient for the molding compositions according to the invention to have a very high degree of filling by the sinterable powder. A concentrated suspension can be prepared by conventional processes. On a small scale, the treatment of the suspension with ultrasound has proven to be a fast and problem-free method. The solvent and surfactant are placed in a glass flask, which is immersed into an ultrasound bath. The powder is fed in in portions until the content of powder is high, but the mixture is still free-flowing. Through the ultrasound treatment, the suspension usually warms to from 50°-60° C. and remains free-flowing.

A more practical method is grinding, for example in a stirred ball mill; this dispersion treatment usually results in higher densities of the sintered molding. To this end, an excess of solvent is added to reduce the viscosity and to facilitate grinding. The excess must be removed again by distillation after the grinding. An alternative is complete drying of the ground suspension in, for example, a spray or paddle dryer. The desired amount of solvent is then added in portions to the resultant surfactant-coated powder in a temperature-controlled, evacuated stirrer unit, for example in a kneader, and the mixture is heated, if necessary, and mixed. The kneaded product can be used directly or converted into a viscous or solid state by cooling. The compound can be comminuted or granulated by slowly rotating the kneading elements in the cooled kneader.

The shaping can be carried out directly with the suspension liquefied by heating by pouring the suspension into a cooled mold. A more suitable method for production is processing in an injection-molding machine. The granules produced in the kneader are plasticated in a cylinder heated to above the solidification temperature of the molding compound, for example at from 20° to 60° C., and injected into a cooled mold at relatively low pressure (1-200 bar). In principle, there is no lower limit for the mold temperature, it merely being necessary for the temperature to be below the solidification temperature of the molding compound. However, for practical reasons (icing, condensing, etc.) a mold temperature of above 5° C. is advisable. If a suitable choice of process parameters (dispersant amount and type, solvent, degree of filling of the suspension, cylinder and mold temperature, cooling time) is made, the molding can be demolded without difficulty.

The molding produced in this way is first freed from the solvent, expediently by drying under reduced pressure at below the solidification temperature of the molding compound. When some (20–30%) of the solvent has been removed, the temperature may, if desired, be increased since the solidification is no longer reversible as the solvent content decreases. In practice, a vacuum of 1 mbar has proven adequate. On a small scale, the vacuum drying can be carried out at room temperature in a standard vacuum-drying oven; for low temperatures, a twin-walled glass vessel is thermostated using a cryostat and evacuated. The drying time is usually from 0.5 to 4 hours.

The surfactant remaining can be removed in a vacuum-drying oven at from 150° to 400° C.; another possibility is pyrolytic removal in nitrogen or air at 250°–600° C.

The resultant compact can be sintered in a conventional atmosphere at the usual temperatures for the particular powder.

The processing of the molding compounds according to the invention combines the advantages of slip casting and injection molding in a hitherto unknown manner. A homogeneous, well-dispersed, highly filled, very free-flowing suspension is injected at a very mild processing temperature in a mold which is from about 30° to 50° C. cooler, and solidified. The relatively small temperature gradient during solidification permits good mold filling and matching of the surface of the suspension to that of the mold, which results in moldings of excellent surface quality. After the solidification, the solvent can be removed rapidly without causing cracking, even from thick moldings. The fact that the evaporation of the solvent is carried out at below the solidification temperature ensures that warping does not occur. The surfactants remaining can likewise be removed easily, and the molding achieves its final shape through the sintering.

EXAMPLE 1

7.9 g of an ethoxylated $C_{16}$–$C_{18}$-fatty alcohol mixture having a mean degree of ethoxylation of 11 were added to 35 g of n-octane in a flask. 278 g of $Al_2O_3$ powder having a mean particle size of 0.5 μm were added in portions with constant acoustic irradiation in an ultrasound bath at such a rate that a low-viscosity, warm suspension (50° C.) was obtained. The suspension had a solidification temperature of 15° C. (content of solvent 10.9% by weight, surfactant 2.4% by weight and sinterable powder 86.6% by weight). The suspension was poured into a polytetrafluoroethylene-coated beaker which could be divided into two halves, and was cooled to 6° C. over the course of one hour. The resultant hard, smooth, cylindrical molding having a diameter of 50 mm and a height of 35 mm was easily removed from the beaker, and was treated first for 2 hours at 5° C. and then for a further 2 hours at 20° C. under reduced pressure falling to 1 bar in order to remove the solvent. No cracking occurred. The surfactant was subsequently burnt out by treating the molding under reduced pressure at 250° C. (2 hours) and then in a chamber kiln at 450° C. (4 hours). The molding treated in this way was heated to 1000° C. at a heating rate of 10° C./min and then to 1650° C. at a heating rate of 2° C./min, and then kept at this temperature for 4 hours. The resultant molding was crack-free and had a density of 3.60 g/cm³.

EXAMPLE 2

10.6 g of a saturated ethoxylated $C_{13}$–$C_{15}$-oxoalcohol mixture having a mean degree of ethoxylation of 3 were added to 38 g of n-octane in a flask, and 266 g of $ZrO_2$ powder which had been stabilized with 2% by weight of $Y_2O_3$ and had a mean particle size of 0.2 μm were added in portions with constant acoustic irradiation in an ultrasound bath. The resultant low-viscosity warm (50° C.) suspension (content of solvent 12.0% by weight, surfactant 3.3% by weight and sinterable powder 84.6% by weight) having a solidification temperature of −12° C. was poured into a beaker as described in Example 1 and cooled to −20° C. over the course of one hour. The cylindrical molding having a diameter of 50 mm and a height of 35 mm removed from the beaker was then dried for in each case 1 hour under reduced pressure falling to 1 mbar at −15° C., −10° C., −5° C. and 20° C. The surfactant was subsequently burnt out as described in Example 1. The molding obtained was heated to 1000° C. at a heating rate of 10° C./min and then to 1500° C. at a heating rate of 2° C./min, and was kept at this temperature for 4 hours. The crack-free sintered article obtained had a density of 5.66 g/cm³.

EXAMPLE 3

6.8 g of an ethoxylated linear $C_{16}$–$C_{18}$-fatty alcohol mixture having a mean degree of ethoxylation of 11, and 340 g of an iron powder having a mean particle size of 4.1 μm were added, as described in Example 1, to 16.5 g of n-hexane, and the warm (50° C.) suspension (solidification temperature 12° C., content of solvent 4.5% by weight, surfactant 1.9% by weight and sinterable powder 93.6% by weight) poured into a beaker was cooled to 3° C. over the course of 30 minutes. The solidified molding was removed from the beaker and dried as described in Example 1. The molding was subsequently heated to 300° C. at a heating rate of 20° C./min in a hydrogen-containing atmosphere in a tube furnace and left at this temperature for half an hour in order to remove the surfactant. It was then heated to 1200° C. at a heating rate of 100° C./min and kept at this temperature for one hour. The crack-free sintered article obtained had a density of 7.01 g/cm³.

EXAMPLE 4

Example 3 was repeated with the difference that the n-hexane was replaced by 19.5 g of cyclohexane. The solidification temperature of the suspension was 7° C. (content in the suspension of solvent 5.3% by weight, of surfactant 1.9% by weight and of sinterable powder 92.8% by weight).

EXAMPLE 5

21.4 g of isobutyl isobutyrate were processed 30 with 6.8 g of an ethoxylated primary $C_{18}$-fatty amine containing a total of 40 ethylene oxide units, and 340 g of iron powder having a mean particle size of 4.1 μm to give a suspension having a solidification temperature of 6° C. (content in the suspension of solvent 5.8% by weight, of surfactant 1.8% by weight and of sinterable powder 92.3% by weight). The warm (50° C.) suspension was cooled to −20° C. in a beaker, and the molding was removed and dried as described in Example 2. The molding was subsequently freed from surfactant as described in Example 3 and processed to give a sintered article.

EXAMPLE 6

7.7 g of an ethoxylated $C_{16}$–$C_{18}$-fatty alcohol mixture having a mean degree of ethoxylation of 11, and 193 g of a sinterable $Si_3N_4$ powder mixture were added, as described in Example 1, to 28 g of n-octane. The powder mixture comprised 92% by weight of $Si_3N_4$ powder having a mean particle size of 0.7 μm, 6% by weight of $Y_2O_3$ powder having a mean particle size of 0.4 μm and 2% by weight of $Al_2O_3$ powder having a mean particle size of 0.5 μm. The suspension having a solidification temperature of 15° C. (content in the suspension of solvent 12.2% by weight, of surfactant 3.3% by weight and of sinterable powder 84.8% by weight) was, as described in Example 1, processed to give a molding, dried and freed from surfactant. The molding was subsequently heated to 1500° C. at a heating rate of 10° C./min under reduced pressure in a gas-pressure sintering furnace and then to 1850° C. at a heating rate of 3° C./min at a nitrogen pressure of 10 bar, and was kept at this temperature for half an hour. The gas pressure was then increased to 100 bar, and pressure-sintering was continued at 1850° C. for a further 30 minutes. The crackfree sintered article obtained had a density of 3.14 g/cm$^3$.

EXAMPLE 7

28 g of n-octane were processed with 9.6 g of an ethoxylated, monounsaturated $C_{18}$-fatty alcohol having a mean degree of ethoxylation of 10, and 240 g of $Al_2O_3$ powder having a particle size of 0.5 μm to give a suspension having a solidification temperature of 0° C. (content in the suspension of solvent 10.1% by weight, of surfactant 3.4% by weight and of sinterable powder 86.5% by weight). The warm (50° C.) suspension was solidified in a beaker by cooling to $-20°$ C., and the molding was dried as described in Example 2 and, as described in Example 1, freed from surfactant and processed to form a sintered article.

EXAMPLE 8

28 g of n-octane were processed with 9.6 g of an ethoxylated $C_{12}$–$C_{14}$-fatty alcohol mixture having a mean degree of ethoxylation of 5, and 240 g of an $Al_2O_3$ powder having a mean particle size of 0.5 μm to give a suspension having a solidification temperature of $-10°$ C. (content in the suspension of solvent 10.1% by weight, of surfactant 3.4% by weight and of sinterable powder 86.5% by weight). The warm (50° C.) suspension was cooled to $-20°$ C. in a beaker, and the molding was removed and processed as described in Example 7 to give a crack-free sintered article.

EXAMPLE 9

35 g of n-octane were processed with 7.9 g of an ethoxylated $C_{12}$–$C_{14}$-fatty alcohol mixture having a mean degree of ethoxylation of 10 and a terminal acetoxy group, and 240 g of $Al_2O_3$ powder having a mean particle size of 0.5 μm to give a suspension having a solidification temperature of $-10°$ C. (content in the suspension of solvent 12.4% by weight, of surfactant 2.8% by weight and of sinterable powder 84.8% by weight). The warm (50° C.) suspension was processed, as described in Example 7, to give a crack-free sintered article.

EXAMPLE 10

28 g of n-octane were processed with 9.6 g of a 70% strength by weight solution in water of an ethoxylated $C_{12}$–$C_{14}$-fatty alcohol polyethylene glycol ether sulfate having a mean degree of ethoxylation of 2, and 240 g of $Al_2O_3$ powder having a mean particle size of 0.5 μm to give a suspension haivng a solidification temperature of $-15°$ C. (content in the suspension of solvent 12.4% by weight, of surfactant 3.4% by weight and of sinterable powder 86.5% by weight). The warm (50° C.) suspension was processed as described in Example 7 to give a crack-free sintered article.

EXAMPLE 11

28 g of n-octane were processed with 9.6 g of an ethoxylated $C_{12}$–$C_{14}$-fatty alcohol polyethylene glycol ether phosphate having a mean degree of ethoxylation of 5, and 240 g of $Al_2O_3$ powder having a mean particle size of 0.5 μm to give a suspension having a solidification temperature of $-12°$ C. (content in the suspension of solvent 12.4% by weight, of surfactant 3.4% by weight and of sinterable powder 86.5% by weight). The warm (50° C.) suspension was processed as described in Example 7 to give a crack-free sintered article.

EXAMPLE 12

28.8 g of diisopropyl ether were processed with 9.6 g of an ethoxylated, linear $C_{16}$–$C_{18}$-fatty alcohol having a mean degree of ethoxylation of 11, and 240 g of $Al_2O_3$ powder having a particle size of 0.5 μm to give a suspension having a solidification temperature of 0° C. (content in the suspension of solvent 10.3% by weight, of surfactant 3.4% by weight and of sinterable powder 86.2% by weight). The warm (50° C.) suspension was solidified in a beaker by cooling to $-20°$ C. and processed as described in Example 7 to give a sintered article.

EXAMPLE 13

34.2 g of isobutyl isobutyrate were processed with 9.6 g of an ethoxylated, linear $C_{16}$–$C_{18}$-fatty alcohol having a mean degree of ethoxylation of 11, and 240 g of $Al_2O_3$ powder having a particle size of 0.5 μm to give a suspension having a solidification temperature of 2° C. (content in the suspension of solvent 10.3% by weight, of surfactant 3.4% by weight and of sinterable powder 84.5% by weight). The warm (50° C.) suspension was solidified in a beaker by cooling to $-20°$ C., and the molding was then dried for 2 hours in each case under reduced pressure falling to 1 mbar at 0° C., 5° C., 10° C. and 20° C. (content in the suspension of solvent 10.3% by weight, of surfactant 3.4% by weight and of sinterable powder 84.5% by weight). The surfactant was subsequently burnt out as described in Example 1. The molding obtained was processed as in Example 1 to give a sintered molding.

EXAMPLE 14

31 g of 2,2,4-trimethylpentane were processed with 8.7 g of an ethoxylated, linear $C_{16}$–$C_{18}$-fatty alcohol having a mean degree of ethoxylation of 11, and 218 g of $Al_2O_3$ powder having a particle size of 0.5 μm to give a suspension having a solidification temperature of 13° C. (content in the suspension of solvent 12.0% by weight, of surfactant 3.4% by weight and of sinterable powder 84.0% by weight). The warm (50° C.) suspension was solidified in a beaker by cooling to −20° C. and processed as in Example 7 to give a sintered article.

EXAMPLE 15

17.5 g of n-octane were processed with 6.8 g of an ethoxylated, linear $C_{18}$-acid having a mean degree of ethoxylation of 9, and 340 g of iron powder having a mean particle size of 4.1 μm to give a suspension having a solidification temperature of 13° C. (content in the suspension of solvent 4.8% by weight, of surfactant 1.9% by weight and of sinterable powder 93.3% by weight). The warm (50° C.) suspension was solidified in a beaker by cooling to −20° C. and processed as described in Example 3 to give a sintered article.

EXAMPLE 16

20.3 g of diisopropyl ketone were processed with 6.8 g of an ethoxylated di-$C_{16}$-$C_{18}$-fatty amine having a mean degree of ethoxylation of 20, and 340 g of iron powder having a mean particle size of 4.1 μm to give a suspension having a solidification temperature of 27° C. (content in the suspension of solvent 5.5% by weight, of surfactant 1.9% by weight and of sinterable powder 92.6% by weight). The warm (50° C.) suspension was cooled to −20° C. in a beaker, and the molding was removed and dried as described in Example 2. The molding was subsequently freed from surfactant as described in Example 3 and processed to give a sintered article.

EXAMPLE 17

28 g of n-octane were processed with 9.6 g of an ethoxylated $C_{22}$-fatty alcohol having a mean degree of ethoxylation of 11, and 240 g of an $Al_2O_3$ powder having a mean particle size of 0.5 μm to give a suspension having a solidification temperature of 26° C. (content in the suspension of solvent 10.1% by weight, of surfactant 3.4% by weight and of sinterable powder 86.5% by weight). The warm (50° C.) suspension was cooled to 3° C. in a beaker and solidified. The molding was subsequently as described in Example 1 to give a sintered article.

EXAMPLE 18

28 g of n-octane were processed with 9.6 g of a $C_{22}$-fatty alcohol containing 5 propylene oxide units and 5 ethylene oxide units as polyether blocks, and 240 g of an $Al_2O_3$ powder having a mean particle size of 0.5 μm to give a suspension having a solidification temperature of 18° C. (content in the suspension of solvent 10.1% by weight, of surfactant 3.4% by weight and of sinterable powder 86.5% by weight). The warm (50° C.) suspension was cooled to 3° C. in a beaker and solidified. The molding was subsequently processed as described in Example 1 to give a sintered article.

EXAMPLE 19

31.5 g of n-octane were processed with 8.7 g of an ethoxylated hydroxybutyramide obtained by reacting a di-$C_{16}$-$C_{18}$-fatty amine with butyrolactone and subsequent ethoxylation with 25 ethylene oxide units, and 198 g of an $Al_2O_3$ powder having a mean particle size of 0.5 μm to give a suspension having a solidification temperature of 21° C. (content in the suspension of solvent 13.2% by weight, of surfactant 3.7% by weight and of sinterable powder 83.1% by weight). The warm (50° C.) suspension was cooled to 3° C. in a beaker and solidified. The molding was subsequently processed as described in Example 1 to give a sintered article.

EXAMPLE 20

45.2 g of an ethoxylated, linear $C_{16}$-$C_{18}$-fatty alcohol having a mean degree of ethoxylation of 18 and 969 g of n-octane were added to 1046 g of $Si_3N_4$ powder having a mean particle size of 0.7 μm, 56.4 g of $Y_2O_3$ powder having a mean particle size of 0.4 μm and 22.4 g of $Al_2O_3$ powder having a mean particle size of 0.5 μm, and the mixture was ground for 1 hour at 50° C. and 3000 rpm in a stirred ball mill. The suspension was evaporated to dryness in a rotary evaporator at 110° C. and 10 mbar.

1079 g of the dried material were kneaded for 2 hours with 154 g of n-octane in a bench kneader heated to 40° C. to give a homogeneous, creamy suspension (content in the suspension of solvent 12.5% by weight, of surfactant 3.4% by weight and of sinterable powder 84.1% by weight). The compound was processed to give free-flowing granules by cooling to 25° C.. The granules were processed in a screw injection-molding machine having a feed zone cooled to 10° C. and having a nozzle heated to 50° C. It was possible to complete the plastification without external supply of heat. The plasticated compound warmed to 50° C. was processed for 1 minute at an injection pressure of 40 bar in a polished metal mold cooled to 15° C. to give disks having a diameter of 80 mm and a thickness of 4 mm. The disks were processed as described in Example 6 to give a sintered molding. The density of the crack-free disk was 3.25 g/cm$^3$.

We claim:
1. A pourable molding compound containing sinterable powders, which comprises, based on the total compound,
   a) from 60 to 97% by weight of sinterable powders selected from the group consisting of an oxidic ceramic powder, a nonoxidic ceramic powder and a metal powder,
   b) from 0.1 to 10% by weight of surfactants, obtained by alkoxylation of aliphatic alcohols, fatty acids, fatty acid amides or aliphatic amines, of the formula

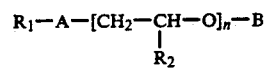

or Ter Maat et al. Ser. No. 07/747,572

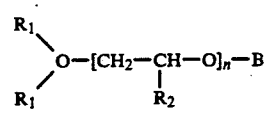

or

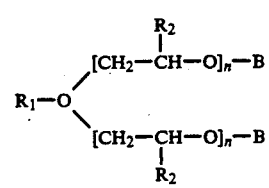

where $R_1$ is an aliphatic hydrocarbon radical having from 10 to 40 carbon atoms, A is

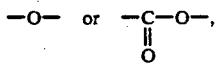

$R_2$ is —H, —$CH_3$ and/or —$CH_2\cdot CH_3$,
B is hydrogen,

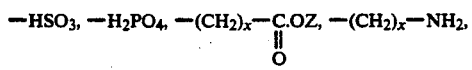

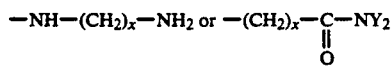

where Z is hydrogen, an alkali metal or ammonium, x is an integer from 1 to 3, and Y is H or —$CH_3$, D is

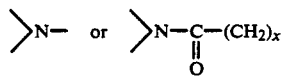

where x is also as defined above, and n is an integer from 1 to 40, and c) from 2 to 35% by weight of an organic solvent having a melting point <10° C. and a boiling point of from 40° to 180° C., selected from the group comprising the alkanes, ethers, esters and ketones.

2. A pourable molding compound as defined in claim 1, wherein the sinterable powder has a particle size of from 0.1 to 50 μm.

3. A pourable molding compound as defined in claim 1, wherein the surfactant is an alkoxylated alcohol having from 16 to 22 carbon atoms.

4. A pourable molding compound as defined in claim 3, wherein the alcohol is ethoxylated.

5. A process for the production of a sintered article from the molding compound defined claim 1, which comprises molding the compound at above its solidification temperature and subsequently cooling to below its solidification temperature, and removing the solvent and the surfactant from the resultant molding before sintering.

6. A process as defined in claim 5, wherein the solvent is removed, at least in part, at below the solidification temperature.

7. A process as claimed in claim 5, wherein the surfactant is removed at from 150° to 600° C.

8. A pourable molding compound as defined in claim 1, wherein the sinterable powder is an oxidic ceramic powder selected from the group consisting of $Al_2O_3$, $ZrO_2$, $Y_2O_3$, $BaTiO_3$ and aluminum silicates.

9. A pourable molding compound as defined in claim 1, wherein the sinterable powder is a a non-oxidic ceramic powder selected from the group consisting of SiC, $Si_3N_4$ and WC.

10. A pourable molding compound as defined in claim 1, wherein the sinterable powder is a metal powder selected from the group consisting of Fe and Si powders.

* * * * *

UNITED STATES PATENT AND TRADEMARK OFFICE
CERTIFICATE OF CORRECTION

PATENT NO. : 5,190,898
DATED : Mar. 2, 1993
INVENTOR(S) : TER MAAT et al.

It is certified that error appears in the above-indentified patent and that said Letters Patent is hereby corrected as shown below:

Claim 1, column 10, line 50, delete "or Ter Maat et al. Ser. No. 07/747/572".

Claim 1, column 11, line 10, the formula "$-(CH_2)_x-C.OZ$" should be -- $-(CH_2)_x-C \cdot OZ$ --.
$$\begin{array}{cc} \| & \| \\ O & O \end{array}$$

Signed and Sealed this

Thirtieth Day of August, 1994

Attest:

BRUCE LEHMAN

*Attesting Officer*    *Commissioner of Patents and Trademarks*